(12) United States Patent
Nichols (10) Patent No.: US 8,114,199 B2
(45) Date of Patent: Feb. 14, 2012

(54) SWEEP AIR SYSTEM FOR MEMBRANE AIR DRYER

(75) Inventor: Randall W. Nichols, Westlake, OH (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 12/902,832

(22) Filed: Oct. 12, 2010

(65) Prior Publication Data

US 2011/0303091 A1    Dec. 15, 2011

Related U.S. Application Data

(62) Division of application No. 11/789,293, filed on Apr. 24, 2007, now Pat. No. 8,066,801.

(51) Int. Cl.
*B01D 53/22* (2006.01)

(52) U.S. Cl. .......... 96/10; 95/45; 95/52; 96/4; 96/8; 210/321.87

(58) Field of Classification Search ......... 95/45, 52; 96/4, 8, 10; 210/321.87
See application file for complete search history.

(56) References Cited

U.S. PATENT DOCUMENTS

| | | | |
|---|---|---|---|
| 3,022,858 A | 2/1962 | Tillyer et al. | |
| 3,722,187 A | 3/1973 | Potter et al. | |
| 4,033,371 A | 7/1977 | Keedwell | |
| 4,220,535 A | 9/1980 | Leonard | |
| 4,256,021 A | 3/1981 | Graninger | |
| 4,652,373 A * | 3/1987 | Trimmer | 210/321.87 |
| 4,929,259 A | 5/1990 | Caskey et al. | |
| 5,149,340 A * | 9/1992 | Waycuilis | 95/49 |
| 5,160,514 A | 11/1992 | Newbold et al. | |
| 5,411,662 A | 5/1995 | Nichols et al. | |
| 5,525,143 A | 6/1996 | Morgan et al. | |
| 5,605,564 A | 2/1997 | Collins | |
| 6,004,383 A | 12/1999 | Kuhnelt | |
| 6,070,339 A | 6/2000 | Cunkelman | |

(Continued)

FOREIGN PATENT DOCUMENTS

WO    WO 2006034840 A2    4/2006

(Continued)

OTHER PUBLICATIONS

Notification of Transmittal of International Search Report issued by the International Searching Authority for PCT/US2008/055740, dated Oct. 20, 2008.

(Continued)

*Primary Examiner* — Jason M Greene
*Assistant Examiner* — Anthony Shumate
(74) *Attorney, Agent, or Firm* — Barnes & Thornburg LLP (57) ABSTRACT

A membrane dryer includes a shell having an inner tube and an outer tube and a bundle of hollow fibers supported in the shell. A dryer air inlet into the hollow fibers and a sweep air outlet from the inner tube are at a first end of the shell. A dryer air outlet into the hollow fibers and a sweep air inlet from the inner tube are at a second end of the shell. The inner tube has a first set of circumferential openings into the sweep air space adjacent the first end of the shell and a second set of circumferential openings into the sweep air space adjacent the first end of the shell; and a second plug is in the inner tube between the first and second set of openings.

8 Claims, 6 Drawing Sheets

U.S. PATENT DOCUMENTS

| | | | |
|---|---|---|---|
| 6,128,825 | A | 10/2000 | Cunkelman |
| 6,136,073 | A | 10/2000 | Coan et al. |
| 6,180,168 | B1 | 1/2001 | Stookey et al. |
| 6,296,683 | B1 | 10/2001 | Koch |
| 6,540,817 | B1 | 4/2003 | Hachimaki |
| 6,616,735 | B1 | 9/2003 | Burban et al. |
| 6,719,825 | B2 | 4/2004 | Wedge et al. |
| 6,740,140 | B2 | 5/2004 | Giglia et al. |
| 6,764,529 | B2 | 7/2004 | Nichols et al. |
| 6,776,820 | B2 | 8/2004 | Bikson et al. |
| 6,790,262 | B2 * | 9/2004 | Sengupta et al. .......... 96/6 |
| 6,681,245 | B1 | 4/2005 | Nichols et al. |
| 6,923,845 | B2 | 8/2005 | Nichols et al. |
| 7,150,830 | B1 * | 12/2006 | Katsube et al. ........ 210/321.8 |
| 7,153,341 | B2 | 12/2006 | Hoyt et al. |
| 7,172,696 | B1 * | 2/2007 | Martinez et al. ...... 210/321.81 |
| 7,264,725 | B2 * | 9/2007 | Vido et al. ........... 210/321.88 |
| 2004/0194483 | A1 | 10/2004 | Hoyt et al. |
| 2008/0060517 | A1 | 3/2008 | Nichols |
| 2008/0087167 | A1 | 4/2008 | Wright et al. |
| 2008/0087168 | A1 | 4/2008 | Wright et al. |
| 2008/0190293 | A1 | 8/2008 | Deubler et al. |

FOREIGN PATENT DOCUMENTS

| | | | |
|---|---|---|---|
| WO | WO 2007090085 | A2 | 8/2007 |

OTHER PUBLICATIONS

Written Opinion Issued by International Searching Authority for PCT/US2008/055740, dated Oct. 20, 2008.

Communication relating to results of Partial International Search & Invitation to Pay Additional Fees for PCT/US2008/055740, mailed Aug. 8, 2008.

Hankison, Sweepsaver Series & HMM Series (Brochure), Modular Membrane Compressed Air Dryers, Energy Savings Through Selective Permeation, 2007 (4 pages).

* cited by examiner

SWEEP AIR SYSTEM FOR MEMBRANE AIR DRYER

CROSS-RELATED APPLICATIONS

The present application claims priority to U.S. Ser. No. 11/789,293 file Apr. 24, 2007 under 35 U.S.C. 121.

BACKGROUND

The present invention relates to a compressed air reservoir and an air dryer and a sweep air system for the dryer. In the illustrated embodiments, the invention is applied to an air braking system of a vehicle, such as a truck. Such a system typically includes an air compressor and a reservoir for storing the compressed air. Compressed air is drawn from the reservoir to provide for application of air brakes and/or other vehicle devices. Such a system also typically includes an air dryer for removing moisture from the compressed air. It is known to use a membrane dryer to remove moisture from the compressed air, and to then remove the moisture from the membrane dryer by a flow of sweep air across the membrane dryer.

SUMMARY OF THE INVENTION

A membrane dryer including a shell having an inner tube and an outer tube; a bundle of hollow fibers supported in the shell between the inner and outer tubes; and first plugs, one at each end of the bundle, that seals the space between the hollow fibers and the inner and outer tubes to form a sweep air space. A dryer air inlet into the hollow fibers between the inner and outer tubes and a sweep air outlet from the inner tube are at a first end of the shell. A dryer air outlet into the hollow fibers between the inner and outer tubes and a sweep air inlet from the inner tube are at a second end of the shell. The inner tube has a first set of circumferential openings into the sweep air space adjacent the first end of the shell and a second set of circumferential openings into the sweep air space adjacent the first end of the shell; and a second plug is in the inner tube between the first and second set of openings.

The membrane dryer may be mounted in a reservoir.

A membrane dryer includes a shell having an inner tube and an outer tube; a bundle of hollow fibers supported in the shell between the inner and outer tubes; and first plugs, one at each end of the bundle, that seals the space between the hollow fibers and the inner and outer tubes to form a sweep air space. A dryer air inlet is into the hollow fibers between the inner and outer tubes and a sweep air outlet from the inner tube is at a first end of the shell. A dryer air outlet is into the hollow fibers between the inner and outer tubes and a sweep air inlet from the inner tube is at a second end of the shell. The inner tube has a first set of circumferential openings into the sweep air space adjacent the first end of the shell and a second set of circumferential openings into the sweep air space adjacent the first end of the shell. A second plug is in the inner tube between the first and second set of openings.

DETAILED DESCRIPTION

Figure 1:
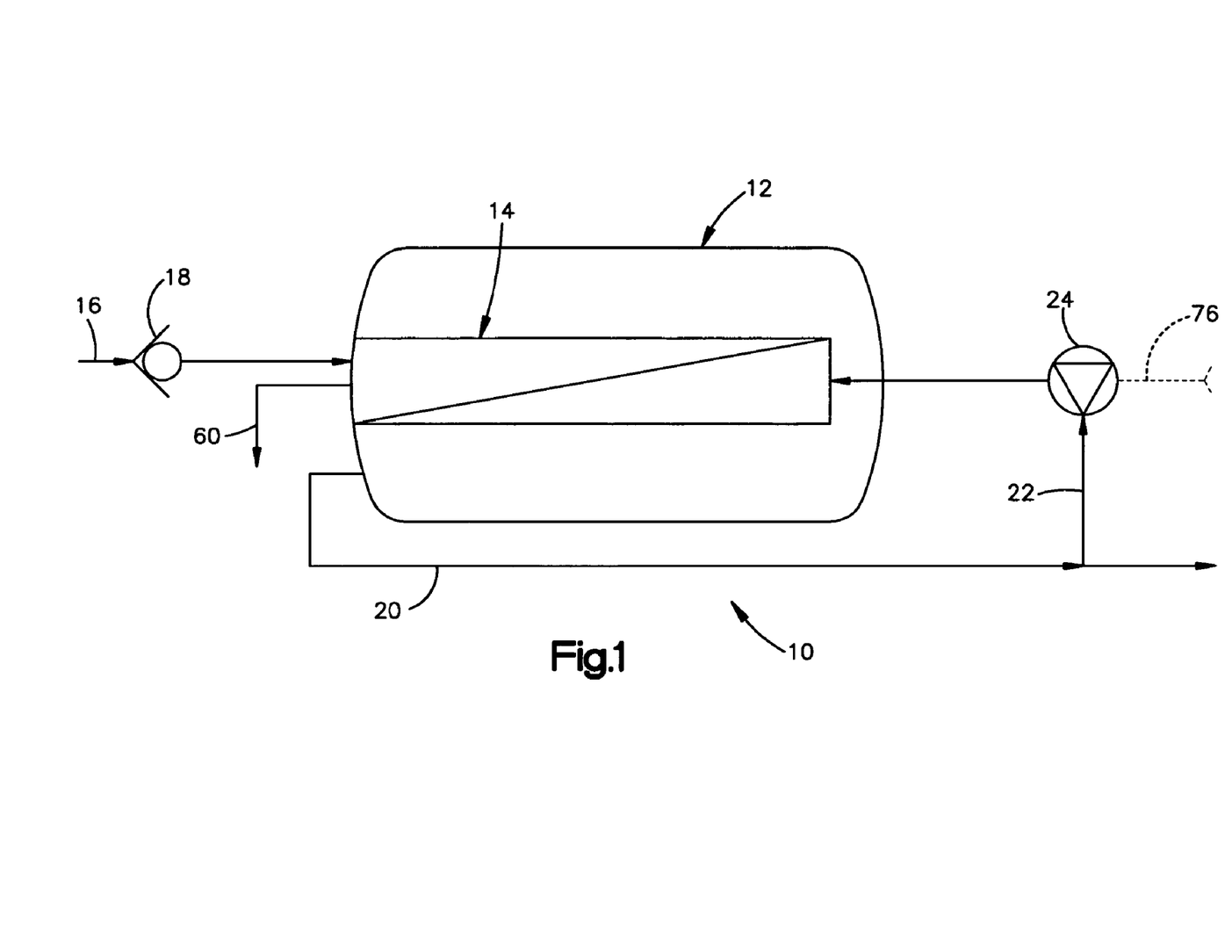
FIG. 1 is a schematic diagram of portions of a compressed air braking system, including a reservoir and a membrane dryer located in the reservoir.

The invention is applicable to air systems of various different types and configurations, and for various different vehicles. As two examples, the invention is applicable to commercial trucks and to locomotives. FIG. 1 is a schematic diagram of portions of a compressed air system 10. The system 10 includes a reservoir 12. A membrane dryer 14 is located in the reservoir 12. An inlet line 16 directs air from a compressor (not shown) into the dryer 14 in the reservoir 12, through a check valve 18. An outlet line 20 directs dried air from the reservoir 12 to vehicle systems, such as brakes, etc. A portion of the dried air is directed through a line 22 to a sweep control valve 24, which controls flow of sweep air to the dryer 14, as described below. The sweep control valve 24 constitutes control means located upstream of the sweep side of the dryer 14, for selectively enabling flow of sweep air to the dryer, as described below.

Figure 2:
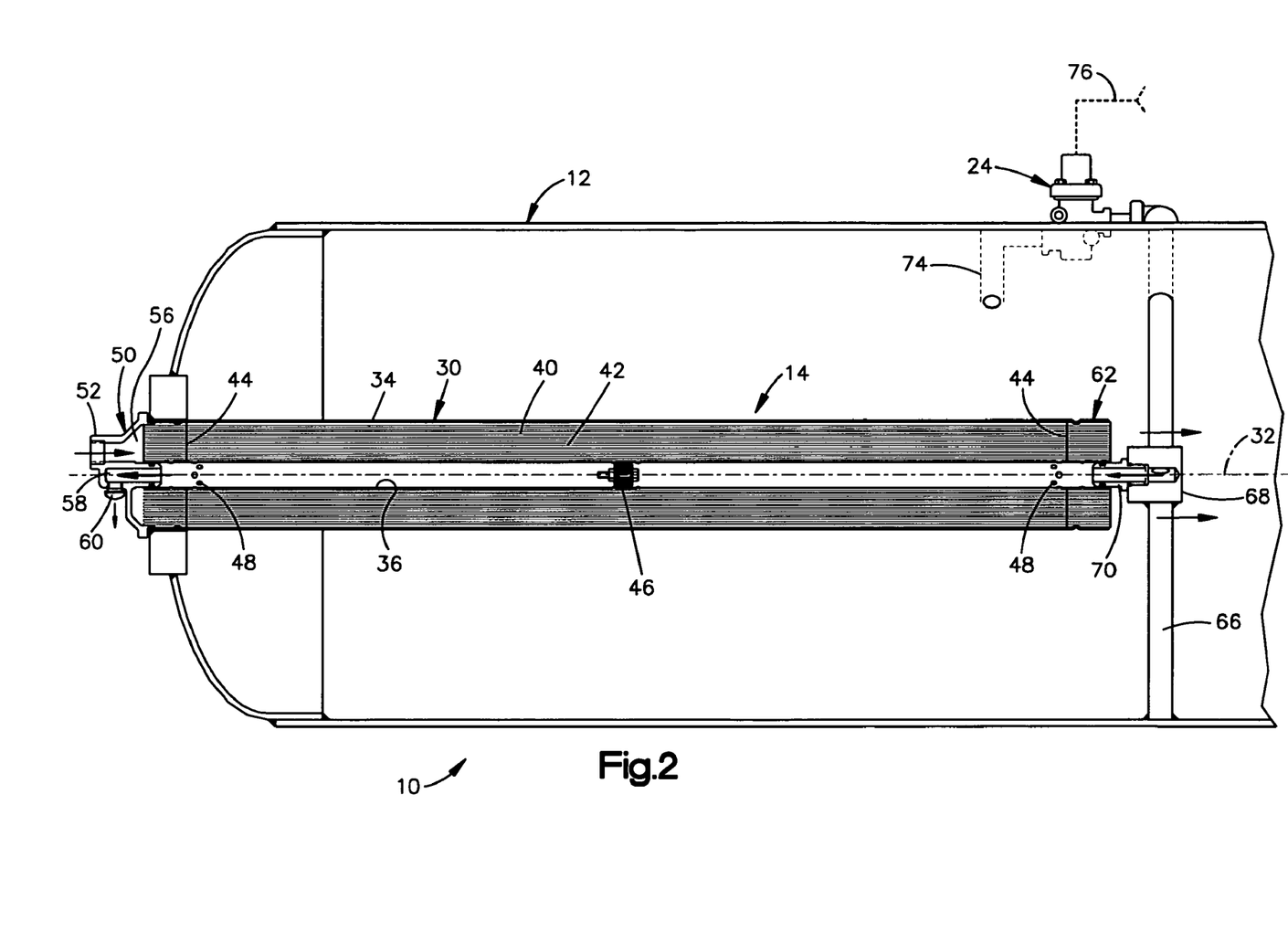
FIG. 2 is an enlarged view of the dryer and portions of the reservoir of FIG. 1, including elements of the sweep control system.

In the embodiment of FIGS. 1 and 2, the dryer 14 is a bore-fed dryer that includes a shell 30 (FIG. 2) with an elongate cylindrical configuration centered on an axis 32 of the reservoir. The shell 30 includes an imperforate outer tube 34 and a perforated inner tube 36.

A tubular bundle 40 of hollow fibers 42 is supported in the shell 30 between the outer and inner tubes 34 and 36. Each fiber 42 is a membrane having a bore though which air to be dried can be passed, to remove water from the air. The bundle 40 of fibers 42 forms a membrane assembly in the dryer 14. At each end of the bundle 40 is an epoxy plug 44, or other suitable material, that seals the spaces between the various fibers 42, to provide a barrier between the high pressure side of the dryer 14 and the low pressure side of the dryer.

In the approximate center of the inner tube 36 is a stopper or plug 46, which may be made of an elastomeric material, such as rubber. The stopper 46 impedes or blocks air flow longitudinally through the inner tube 36 and forces air to flow through openings 48 in the inner tube and thus to move radially outward into the bundle 40 of fibers 42.

An inlet housing 50 is located at one end of the dryer 14, supported on the end wall of the reservoir 12. The inlet housing 50 has a compressor inlet 52 in fluid communication with the check valve 18. The compressor inlet 52 opens into an inlet chamber 56 that directs compressed air into the bores of the fibers 42. The inlet housing 50 also has a centrally located sweep air outlet chamber 58, that opens from the inner tube 36 of the shell 30. The sweep air outlet chamber 58 has a sweep vent 60 for venting air and water to the atmosphere. The sweep vent 60 is open to atmosphere, as described below in detail.

The opposite end 62 of the dryer 14 is also supported on the reservoir 12, at a location within the reservoir. In this particular embodiment, the opposite end 62 of the dryer 14 is supported by an internal support 66 of the reservoir 12, on the axis 32. The internal support 66 is configured as a sweep air inlet pipe that is physically connected with the reservoir 12. The pipe 66 has a fitting 68 that places the interior of the pipe in fluid communication with a sweep air nozzle 70 that is itself in communication with the inner tube 36 of the dryer shell 30. Thus, the internal support 66 for the dryer 14, which is the inlet pipe, doubles as a sweep air feed conduit.

The sweep air inlet pipe 66 is connected with the sweep control valve 24. The sweep control valve 24 in this particular embodiment is shown located on the outside of the reservoir 12, although it could be located elsewhere in other embodiments. The sweep control valve 24 is connected with the interior of the reservoir 12 through a supply pipe 74. The sweep control valve 24 is controlled by a control signal shown schematically at 76, which maybe an electrical control line. The system 10 may, for example, include an electronically operated controller (not shown) that, in a known manner, opens and closes (fully or proportionally) the sweep control valve 24. The system 10 thus provides for sweep air flow from the reservoir 12, through the supply pipe 74, into and through the sweep control valve 24, through the conduit 66 and the nozzle 70, and into the dryer 14.

When the system 10 is charging, compressed air from the compressor flows through the check valve 18, the compressor inlet 52, and the inlet chamber 56, into the bores of the fibers 42, and is dried therein. Water that is removed from the air migrates to the outside of the fibers 42. The dried air from the fibers 42 of the fiber bundle 40 flows through the opposite (outlet) end 62 of the dryer 14 and into the reservoir 12, where it is stored.

The sweep air is provided to remove the water from the outside of the fibers 42. When the sweep control valve 24 is open, dry air flows from the reservoir 12 through the supply pipe 74, through the sweep control valve 24, and through the inlet pipe 66, into the inner tube 36 of the shell 30. This air constitutes the sweep air for the dryer 14. The inner tube 36 of the shell 30, together with the spaces between the several fibers 42, forms a sweep air chamber of the dryer 14. The sweep air flows through the perforations 48 in the inner tube 36 to surround the various fibers 42 and pick up moisture from them. The sweep air transports the moisture to the sweep air outlet chamber 58 and then to the sweep vent 60. The sweep air, and any moisture that it has picked up, exits through the sweep vent 60.

The sweep vent 60 is open to atmosphere. There is no valve located in the fluid flow path between the membrane fibers 42 and atmosphere (downstream of the fibers), blocking flow out of the sweep vent or closing it off. The fiber bundle 40 in the dryer 14 is continuously, or constantly, exposed to atmosphere through the sweep vent 60. The sweep vent thus vents sweep air whenever there is sweep air flowing through the dryer 14, that is, when the sweep valve 24 is open. When the sweep control valve 24 is closed, accordingly, sweep air flow is not flowing through the dryer and venting through the sweep vent 60, even though the sweep vent is open.

When the sweep valve 24 is closed, the open condition of the sweep vent 60 means that moist air does not accumulate at the location of the sweep vent or in any associated piping, moisture that might freeze in cold weather and disrupt operation; rather, the moist air can migrate out of the dryer 14 through the open sweep vent, because there is some exchange or flow of air into and out of the dryer through the open vent. In that sense, it can be said that the sweep vent 60 vents sweep air continuously. Also, because of the continuous, or constant, exposure of the membrane bundle 40 to atmosphere, there is little or no moisture accumulation in the form of condensation on the shell side of the dryer 14, which condensation could decrease efficiency of the dryer.

To enable the sweep vent 60 to be left open, the flow of sweep air through the dryer 14 is controlled upstream of the sweep vent, or there would be a constant flow of sweep air through the dryer, potentially discharging the reservoir 12. In the illustrated embodiment, as one example, the sweep control valve 24 is located external to the reservoir 12, upstream of the dryer 14, and in fluid communication with both the interior of the reservoir and the sweep feed conduit 66. Dry air is piped from the reservoir 12 to the sweep valve 24, which controls the sweep air flow, and into the conduit 66. From the conduit it flows into the sweep side of the dryer 14.

Proportional control of sweep air flow is possible with this system 10. Proportional control requires throttling of the sweep air. Any attempt to throttle sweep air flow exhaust, downstream of a membrane dryer, produces back pressure on the low pressure side of the dryer. This decreases dryer performance. In contrast, when the sweep control valve is located upstream of the sweep side of the dryer, closing off sweep flow does not create back pressure to the detriment of membrane drying performance.

One preferred range for sweep air flow is from about 15% to from about 20% of the main air flow. Excess sweep air flow would waste dried air in the vehicle. Too little sweep air flow would not remove enough moisture from the air being dried for use in the vehicle. Of course, vehicles during operation have varying main air flow because the compressor is driven in relation to engine speed, which varies, and because the demand on the system (drawing air out of the reservoir) varies significantly over time.

Because the dryer 14 is located inside the reservoir 12, it does not require a separate space or mounting location on the vehicle. In addition, an assembly in which the dryer 14 is mounted on the axis 32 of the reservoir 12 is less difficult to fabricate than one in which the dryer is mounted on the bottom side wall of the reservoir, and provides for simpler operation of the sweep vent.

Another advantage of the system of FIGS. 1 and 2 is that there is no significant pressure cycling on the membrane dryer 14. Specifically, the high pressure (upstream) side of the dryer membrane 40 is pressurized to full system pressure at all times. The low pressure (downstream) side of the membrane 40 is at atmospheric pressure at all times. Therefore, there is no significant cycling; pressure drop is limited to the difference (about 20 psi) between compressor cut in pressure, and compressor cut out pressure. Therefore, the pressure variation in the bores of the fibers 42, over time, is limited, which can help to increase the longevity of the fibers.

Figure 3:
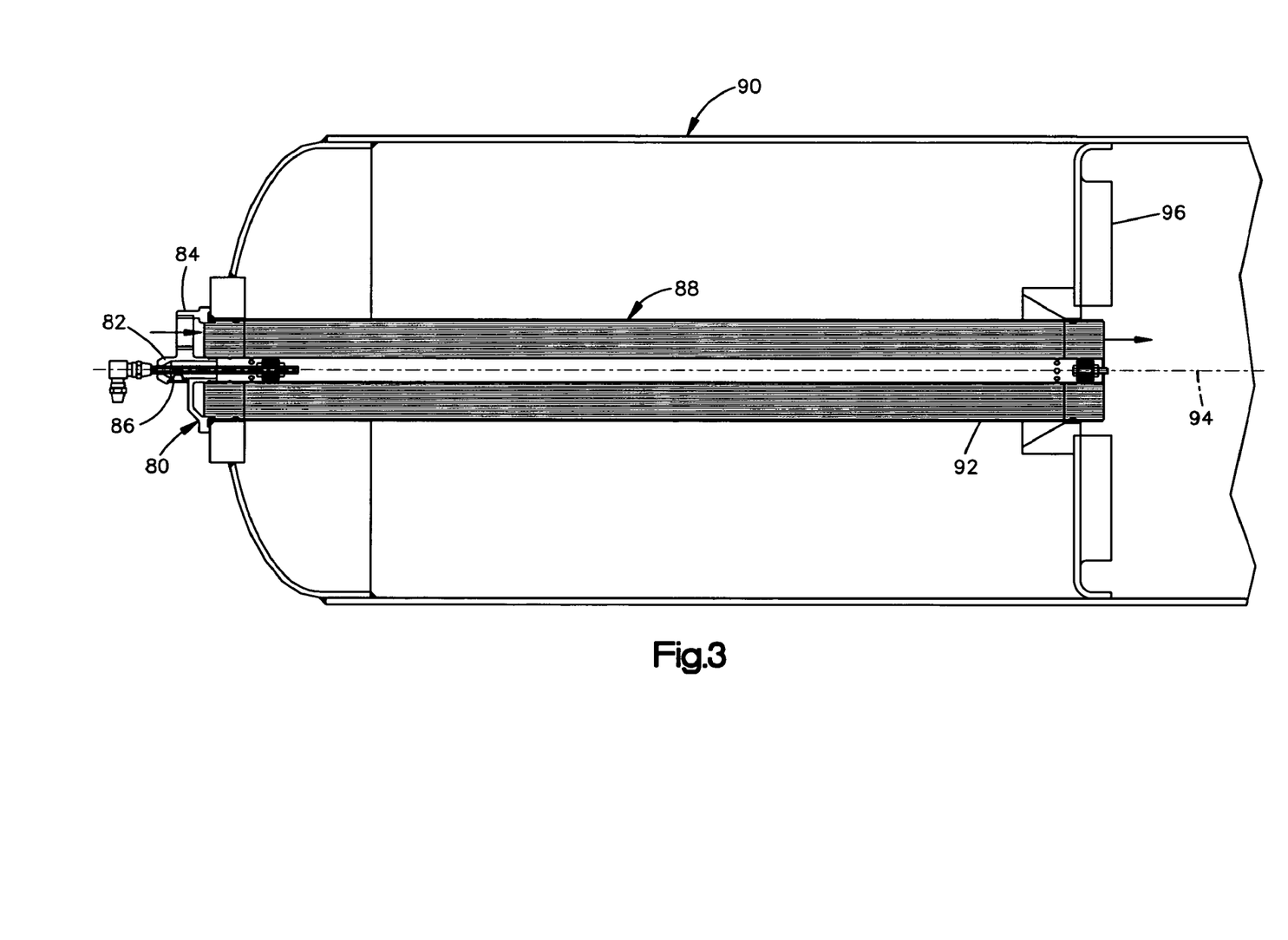
FIG. 3 is a view similar to FIG. 2 of a different reservoir and dryer system.

FIG. 3 illustrates another embodiment of the invention, also for a locomotive (but usable elsewhere), but having a different sweep air inlet structure. Specifically, the sweep air inlet connection inside the reservoir (as in the embodiment of FIGS. 1 and 2) is eliminated. Instead, sweep air flows into an end cap 80 that includes both a sweep air inlet 82 and a compressor air inlet 84, as well as a sweep vent 86. As in the embodiment of FIGS. 1 and 2, dry air from the dryer 88 flows into the reservoir 90. The inner end 92 of the dryer is supported inside the reservoir 90, on the axis 94, by a spider 96. In this system the sweep air connection inside the reservoir 90 is eliminated, and all connections are external to the reservoir and are at one point only, for ease of servicing.

Figure 4:
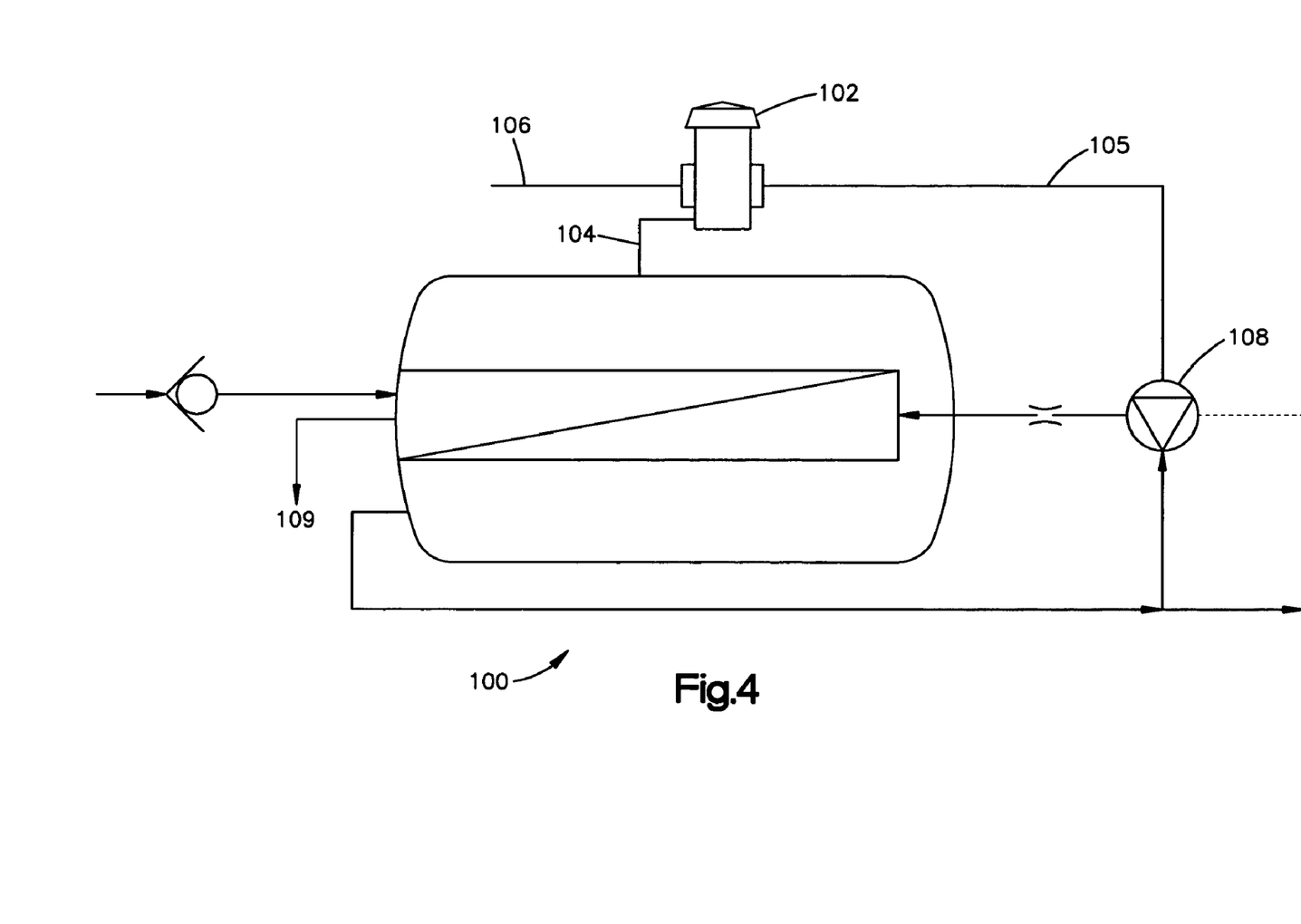
FIG. 4 is a view similar to FIG. 1 of a further braking system.
Figure 5:
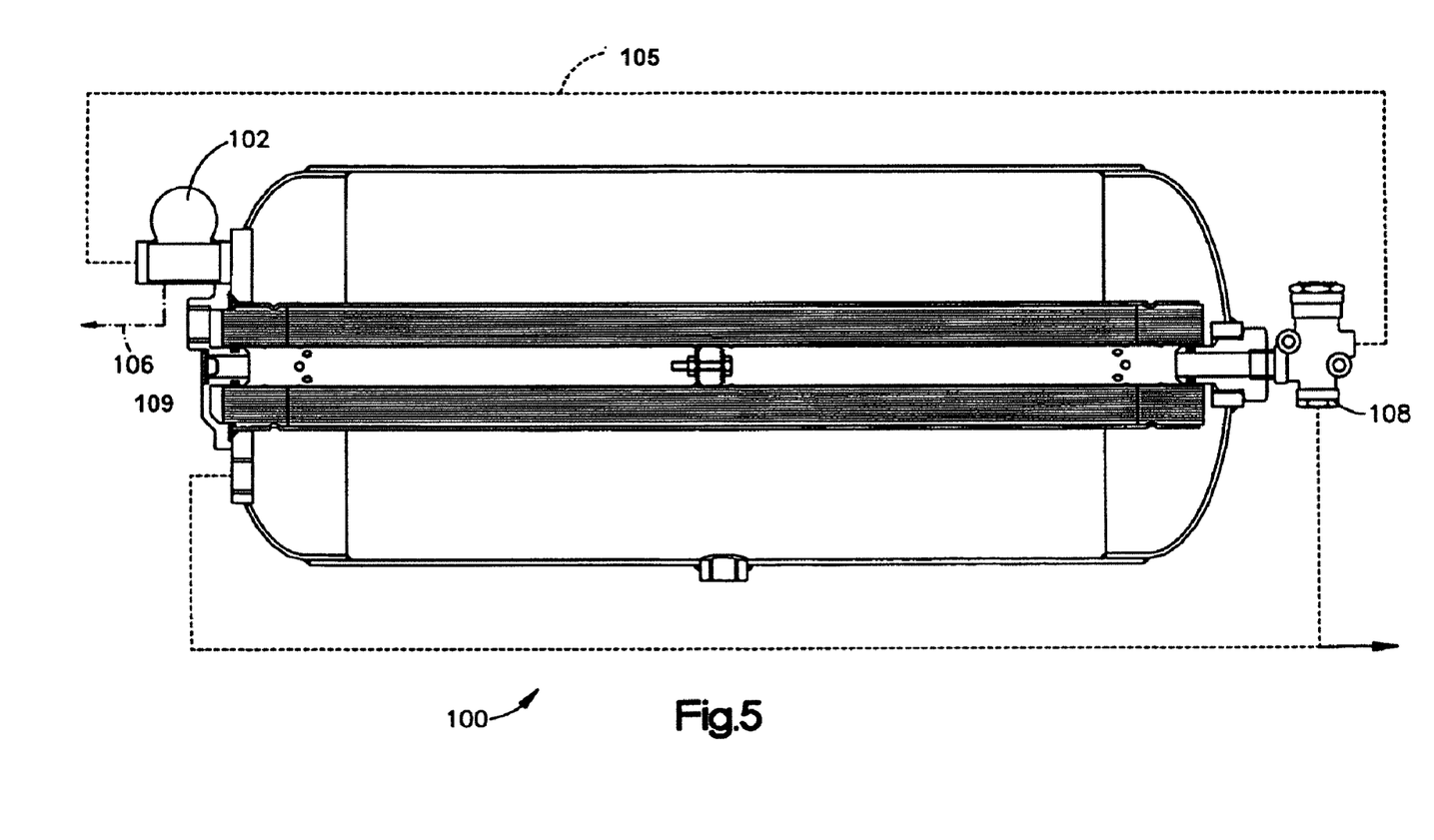
FIG. 5 is a view similar to FIG. 2 of portions of the system of FIG. 4.

FIGS. 4 and 5 illustrate another embodiment of the invention, for a commercial truck but usable elsewhere. The system 100 includes a governor 102 that responds to reservoir (system) pressure through a line 104 and that turns the compressor on and off accordingly, via a control line 106. The system pressure is also directed to the sweep valve 108 through line 105 so that, when the pressure is low enough to turn the compressor on, the sweep valve is also opened. The sweep valve 108 is located upstream of the dryer and of the sweep vent 109, which is open to atmosphere.

Figure 6:
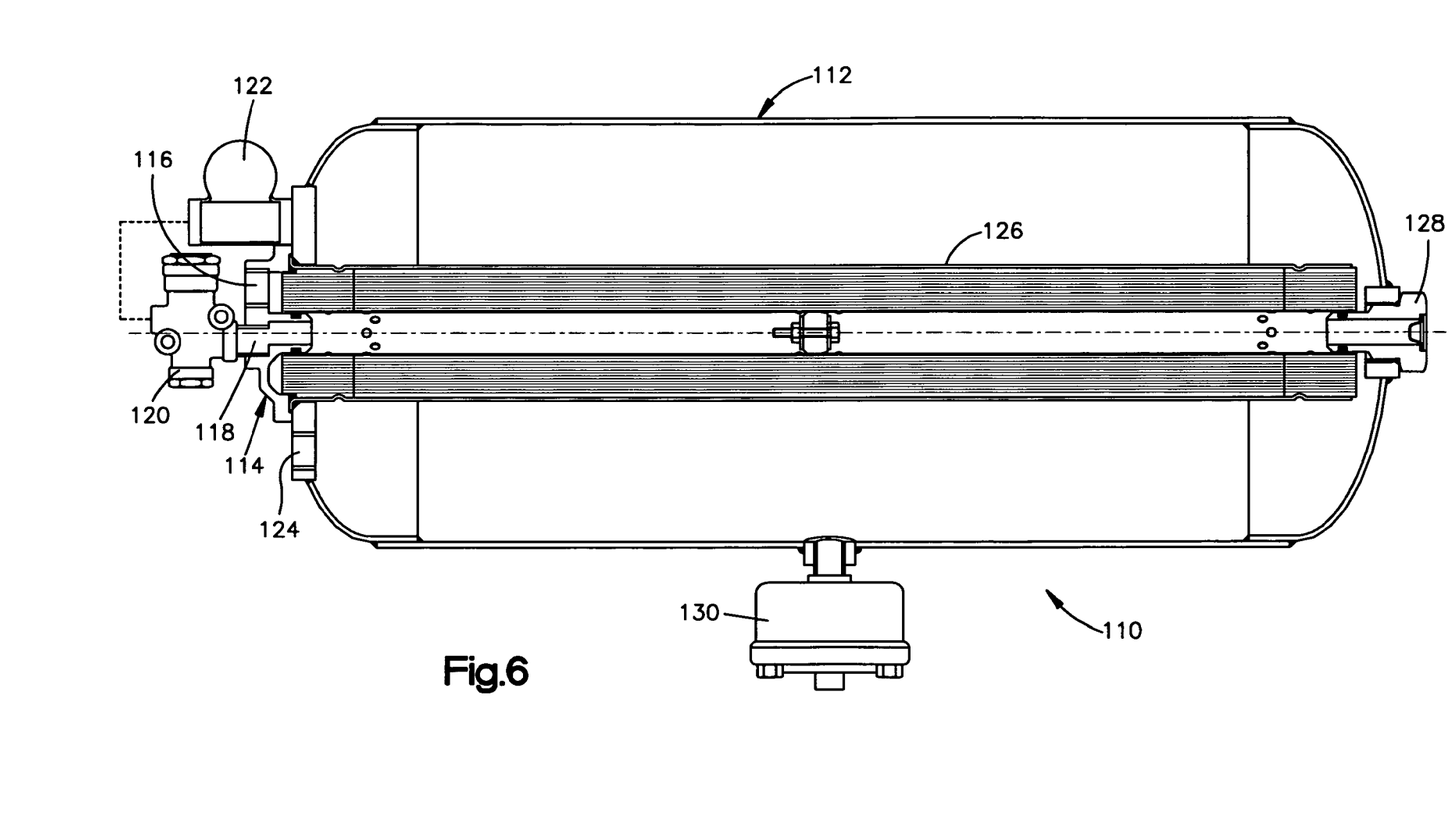
FIG. 6 is a view similar to FIG. 2 of yet another system.

FIG. 6 illustrates another embodiment of the invention, specifically with a reverse flow path. In the system 110 shown in FIG. 6, overall flow is reversed so that wet compressed air flows first into the reservoir 112. At one end of the reservoir 112, wet compressed air flows into the reservoir through an inlet 124. Wet air flows from the reservoir 112 into the dryer 126 to be dried during the times when the system 110 pulls air (from a reservoir outlet 116 in inlet housing 114, through the dryer).

A sweep valve 120 receives sweep air supply through a connector of a governor 122. The sweep air supply is not controlled by the governor. The sweep air is directed into the dryer at an inlet 118 and exits via a sweep air vent 128. The sweep valve 120 is thus located upstream of the dryer and of the sweep vent 128, which is open to atmosphere. There is also provided an automatic liquid drain valve 130 from the reservoir in addition to the sweep vent 128.

Having described the invention, I claim:

1. A membrane dryer comprising:
   a shell having an inner tube and an outer tube;
   a bundle of hollow fibers supported in the shell between the inner and outer tubes;
   first plugs, one at each end of the bundle, that seals the space between the hollow fibers and the inner and outer tubes to form a sweep air space;
   a dryer air inlet into the hollow fibers between the inner and outer tubes and a sweep air outlet from the inner tube being at a first end of the shell;
   a dryer air outlet into the hollow fibers between the inner and outer tubes and a sweep air inlet from the inner tube being at a second end of the shell;
   the inner tube having a first set of circumferential openings into the sweep air space adjacent the first end of the shell and a second set of circumferential openings into the sweep air space adjacent the first end of the shell; and
   a second plug in the inner tube between the first and second set of openings.

2. Membrane dryer as set forth in claim 1, wherein the second plug is substantially centered in the inner tube.

3. Membrane dryer as set forth in claim 1, including a housing at the first end of the shell including the dryer air inlet and the sweep air outlet; and a nozzle at the second end of the shell into the sweep air inlet.

4. Membrane dryer as set forth in claim 3, wherein the membrane dryer is mounted in a reservoir inlet at a first end of the reservoir by the housing and the second end of the shell is interior the reservoir with dryer air outlet being into the reservoir.

5. Membrane dryer as set forth in claim 4, wherein the nozzle mounts the second end of the shell to and extends through a second end of the reservoir.

6. Membrane dryer as set forth in claim 1, including a housing at the second end of the shell including the dryer air outlet and the sweep air inlet; and a nozzle at the first end of the shell into the sweep air outlet.

7. Membrane dryer as set forth in claim 6, wherein the membrane dryer is mounted in a reservoir inlet at a first end of the reservoir by the housing and the first end of the shell is interior the reservoir with dryer air inlet being into the reservoir.

8. Membrane dryer as set forth in claim 7, wherein the nozzle mounts the first end of the shell to and extends through a second end of the reservoir.

* * * * *